United States Patent [19]

Woodsum

[11] Patent Number: 4,660,202

[45] Date of Patent: Apr. 21, 1987

[54] ERROR PROTECTION METHOD FOR PACKETED DATA

[75] Inventor: Gregory T. Woodsum, Mt. Prospect, Ill.

[73] Assignee: Zenith Electronics Corporation, Glenview, Ill.

[21] Appl. No.: 728,119

[22] Filed: Apr. 29, 1985

[51] Int. Cl.$^4$ ............................................. G06F 11/10
[52] U.S. Cl. .......................................... 371/50; 371/37
[58] Field of Search .......................... 371/50, 49, 2, 37

[56] References Cited

U.S. PATENT DOCUMENTS

| | | | |
|---|---|---|---|
| 3,037,697 | 6/1962 | Kahn | 371/50 |
| 3,982,064 | 9/1976 | Barnaby | 178/5.6 |
| 3,982,065 | 9/1976 | Barnaby | 178/5.8 R |
| 4,044,328 | 8/1977 | Herff | 371/50 |
| 4,156,867 | 5/1979 | Bench et al. | 371/50 X |
| 4,213,124 | 7/1980 | Barda | 340/706 |
| 4,464,747 | 8/1984 | Groudan et al. | 371/50 |
| 4,470,142 | 9/1984 | Ive | 371/2 |
| 4,594,712 | 6/1986 | Perry et al. | 371/49 X |

OTHER PUBLICATIONS

Lin et al., Error Control Coding–Fundamentals and Applications, Prentice Hall, Inc., Englewood Cliffs, N.J., 1983, pp. 274–278.

British Broadcasting Corp, "Broadcast Teletext Specification", Sep., 1976.

VG Electronics Product Information Bulletin Document No. V1/01, Vertical Interval Inserter Type VGE1052.

G. O. Crowther, "Teletext and Viewdata Systems and Their Possible Extension to Europe and U.S.A.", IEEE Trans. on Consumer Electronics, vol. CE-25, No. 3, Jul. 1979, pp. 288–293.

Beakhust and Gander, "Teletext and Viewdata-a Comprehensive Component Solution", Proc. IEE, vol. 126, No. 12, Dec. 1979, pp. 1374–1396.

K. Pandey, "Second General Teletext and Viewdata Decoders", Proc. IEE, vol. 126, No. 12, Dec. 1979, pp. 1367–1373.

Primary Examiner—Charles E. Atkinson

[57] ABSTRACT

A forward error data protection method comprises formatting a page of data bytes in the form of a plurality of square matrices each protected by both horizontal and vertical longitudinal parity bytes. The formatted matrix rows are transmitted in the form of a plurality of sequential data packets in which maximum separation is maintained between the rows of each respective matrix. At the receiver, each protected matrix is reconstructed and processed by deriving resultant vertical and horizontal longitudinal parity bytes for each column and row of the matrix to detect odd bit data errors, even bit data errors or complete data packets lost in transmission. The errors are corrected and the lost data packets are restored by processing the erroneous data bytes with the resultant vertical and horizontal longitudinal parity bytes.

18 Claims, 13 Drawing Figures

|  | COLUMN 0 | COLUMN 1 | COLUMN 2 | COLUMN 3 |
|---|---|---|---|---|
| ROW 0 | DATA BYTE 0,0 | DATA BYTE 0,1 | DATA BYTE 0,2 | HLPB 0,3 |
| ROW 1 | DATA BYTE 1,0 | DATA BYTE 1,1 | DATA BYTE 1,2 | HLPB 1,3 |
| ROW 2 | DATA BYTE 2,0 | DATA BYTE 2,1 | DATA BYTE 2,2 | HLPB 2,3 |
| ROW 3 | VLPB 3,0 | VLPB 3,1 | VLPB 3,2 | CHK SUM |

|  | COLUMN 0 | COLUMN 1 | COLUMN 2 | COLUMN 3 |
|---|---|---|---|---|
| ROW 0 | 1 0 1 0 1 0 1 0 | 0 1 0 0 1 1 0 0 | 1 1 0 0 1 0 1 0 | 1 1 0 1 0 0 1 0 |
| ROW 1 | 0 1 1 0 1 0 1 0 | 0 1 0 1 1 1 0 0 | 1 0 1 0 0 1 1 0 | 0 1 1 0 1 1 1 0 |
| ROW 2 | 1 0 1 0 1 0 1 0 | 1 1 1 0 0 1 0 0 | 0 0 1 0 1 1 0 0 | 1 0 0 1 1 1 0 0 |
| ROW 3 | 1 0 0 1 0 1 0 0 | 0 0 0 0 1 0 1 0 | 1 0 1 1 1 1 1 0 | 1 1 0 1 1 1 1 0 |

|  | 8 BYTES | 16 BYTES | | 8 BYTES |
|---|---|---|---|---|
| PACKET 0 | ADDRESS | LEADER MATRIX | | A0 |
| PACKET 1 | B0 | C0 | D0 | E0 |
| PACKET 2 | F0 | G0 | H0 | I0 |
| PACKET 3 | J0 | K0 | A1 | B1 |
| ⋮ | | | | |
| PACKET 6 | K1 | A2 | B2 | C2 |
| ⋮ | | | | |
| PACKET 22 | I7 | J7 | K7 | 0 |

| PACKET 0 | ADDRESS | LEADER MATRIX | | | | | A0 | B0 |
|---|---|---|---|---|---|---|---|---|
| ⋮ | | | | | | | | |
| PACKET 3 | S0 | T0 | U0 | V0 | W0 | X0 | Y0 | Z0 |
| PACKET 4 | AA0 | BB0 | CC0 | DD0 | EE0 | FF0 | GG0 | HH0 |
| ⋮ | | | | | | | | |
| PACKET 6 | QQ0 | RR0 | SS0 | TT0 | A1 | B1 | C1 | D1 |
| ⋮ | | | | | | | | |
| PACKET 23 | OO3 | PP3 | QQ3 | RR3 | SS3 | TT3 | 0 | 0 |

Fig. 10

| | COLUMN 0 | COLUMN 1 | COLUMN 2 | COLUMN 3 | COLUMN 4 |
|---|---|---|---|---|---|
| ROW 0 | 10101010 | 01001100 | 11001010 | 11010010 | 0000000X |
| ROW 1 | 01101010 | 01011100 | 10100110 | 01101110 | 0000000X |
| ROW 2 | 10101010 | 11100100 | 00101100 | 10011100 | 0000000X |
| ROW 3 | 10010100 | 00001010 | 10111110 | 11011110 | 0000000X |
| ROW 4 | 0000000X | 0000000X | 0000000X | 0000000X | |

Fig. 11

| | COLUMN 0 | COLUMN 1 | COLUMN 2 | COLUMN 3 | COLUMN 4 |
|---|---|---|---|---|---|
| ROW 0 | 10001011 | 01001111 | 11001010 | 11010010 | 0010001X |
| ROW 1 | 01101010 | 01011100 | 10100110 | 01101110 | 0000000X |
| ROW 2 | 10101010 | 11100100 | 00101100 | 10011100 | 0000000X |
| ROW 3 | 10010100 | 00001010 | 10111110 | 11011110 | 0000000X |
| ROW 4 | 0010000X | 0000001X | 0000000X | 0000000X | |

Fig. 12

| | COLUMN 0 | COLUMN 1 | COLUMN 2 | COLUMN 3 | COLUMN 4 |
|---|---|---|---|---|---|
| ROW 0 | 11111111 | 11111111 | 11111111 | 11111111 | 1111111X |
| ROW 1 | 01101010 | 01011100 | 10100110 | 01101110 | 0000000X |
| ROW 2 | 10101010 | 11100100 | 00101100 | 10011100 | 0000000X |
| ROW 3 | 10010100 | 00001010 | 10111110 | 11011110 | 0000000X |
| ROW 4 | 0101010X | 1011001X | 0011010X | 0010110X | |

Fig. 13

| | COLUMN 0 | COLUMN 1 | COLUMN 2 | COLUMN 3 | COLUMN 4 |
|---|---|---|---|---|---|
| ROW 0 | 00101000 | 01001100 | 11001010 | 11010010 | 1000001X |
| ROW 1 | 01101010 | 01011100 | 10100110 | 01101110 | 0000000X |
| ROW 2 | 10101010 | 11100100 | 00101100 | 10011100 | 0000000X |
| ROW 3 | 10010100 | 00001010 | 10111110 | 11011110 | 0000000X |
| ROW 4 | 1000001X | 0000000X | 0000000X | 0000000X | | ary of the invention to provide a
forward error protection method capable of detecting
and recovering lost multiple byte packets in a data
transmission system.

ERROR PROTECTION METHOD FOR PACKETED DATA

BACKGROUND OF THE INVENTION

The present invention relates generally to the field of forward error protection for data transmission systems and particularly concerns a forward error protection method providing for the recovery of lost multiple byte data packets at a receiving site.

Digitally encoded data is presently being transmitted through a variety of mediums for servicing diverse end users. For example, teletext is a well known one-way medium for transmitting digital information along with a normal television signal. The data is broken up into packets each typically comprising 32 data bytes with each packet being encoded onto an individual television line normally in the vertical blanking interval of the signal. At the receiving site, this packeted information is grouped together and decoded to form pages which may be selected by a subscriber for display on his television receiver. Other data delivery services use similar packeted data transmission techniques but the received and decoded information may not be suitable for display by a television receiver. Instead, this information may be delivered to a printer or other display device such as a terminal or home computer. In such data services, the receiving equipment is normally programmed to automatically acquire the desired data in an unattended manner rather than effecting data acquisition in response to specific subscriber inputs as in the case of conventional teletext systems.

In view of the foregoing, it will be appreciated that if there are errors in a received page of a conventional video teletext service, the subscriber can either simply ignore the errors or request that the data be re-acquired. However, in the case of unattended data delivery services, the errors will have to be tolerated unless some mechanism is provided in the decoder to detect and correct the erroneous information.

Odd parity is one known technique for detecting errors in transmitted data. In particular, each byte of the transmitted information comprises seven bits of data and one parity bit, the parity bit being generated by Exclusive-Oring the seven data bits and complementing the result. Thus, a logical 1 parity bit is generated if the byte comprises an even number of logical 1 data bits and a logical 0 parity bit is generated if the byte comprises an odd number of logical 1 data bits. By comparing each parity bit with its associated data bits the decoder can therefore determine whether a received data byte has an odd number of data bits in error, i.e., an odd bit error. While such errors can be detected using this method, there is no facility provided for correcting the error.

A further known level of forward error protection comprises the generation of a so-called longitudinal parity byte in respect of a number of data bytes. Generally, a single longitudinal parity byte is generated and transmitted for each data packet. The longitudinal parity byte, which provides a facility for recovering one incorrectly received data byte per packet, is formed by Exclusive-Oring the corresponding bits of each data byte in the packet and complementing the result. This technique is similar to the way a parity bit is formed for each byte, but, in this case, the Exclusive-Oring is carried out on a byte level rather than on a bit level. One limitation of this technique is that when a complete packet is lost in transmission, contrasted with the loss of a single byte, there is no way to recover the lost information.

OBJECTS OF THE INVENTION

It is therefore a basic object of the present invention to provide an improved forward error protection method for data transmission systems.

It is a more specific object of the invention to provide a forward error protection method capable of detecting and recovering lost multiple byte packets in a data transmission system.

It is a further object of the invention to provide a forward error protection method of the foregoing type which has the flexibility of providing for different levels of error protection.

BRIEF DESCRIPTION OF THE DRAWINGS

The features of this invention which are believed to be novel are set forth with particularity in the appended claims. The invention, together with its objects and the advantages thereof, may best be understood by reference to the following description taken in conjunction with the accompanying drawings in which:

FIGS. 10–13 are graphical representations of the implementation of the steps illustrated in the flow charts of FIGS. 8 and 9 under various conditions.

DESCRIPTION OF THE PREFERRED EMBODIMENT

Figure 1:
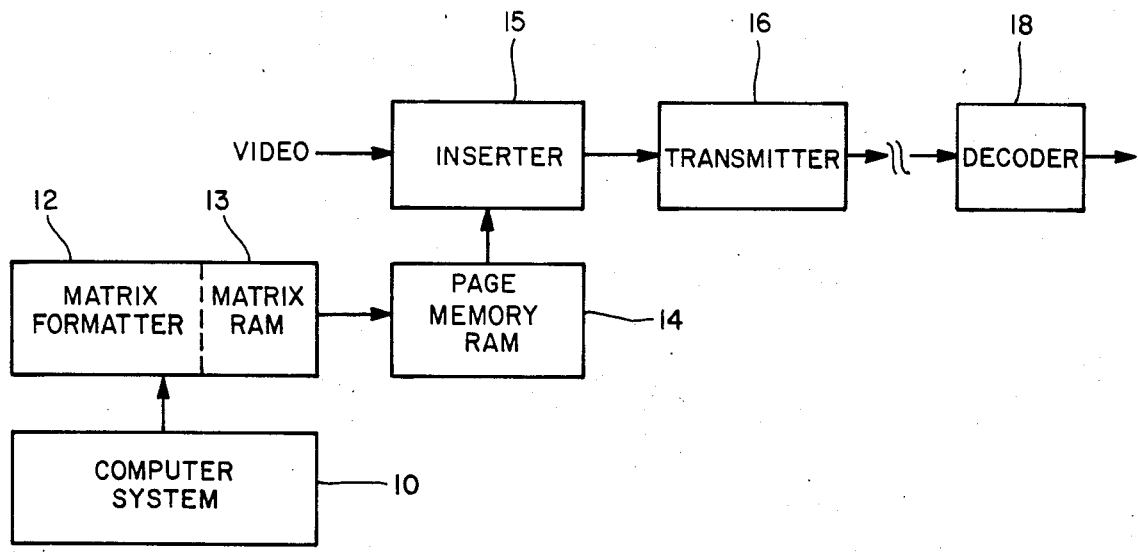
FIGS. 1 and 2 are respective block diagrams of transmitting and receiving apparatus useful in practicing the method fo the invention.
Figure 2:
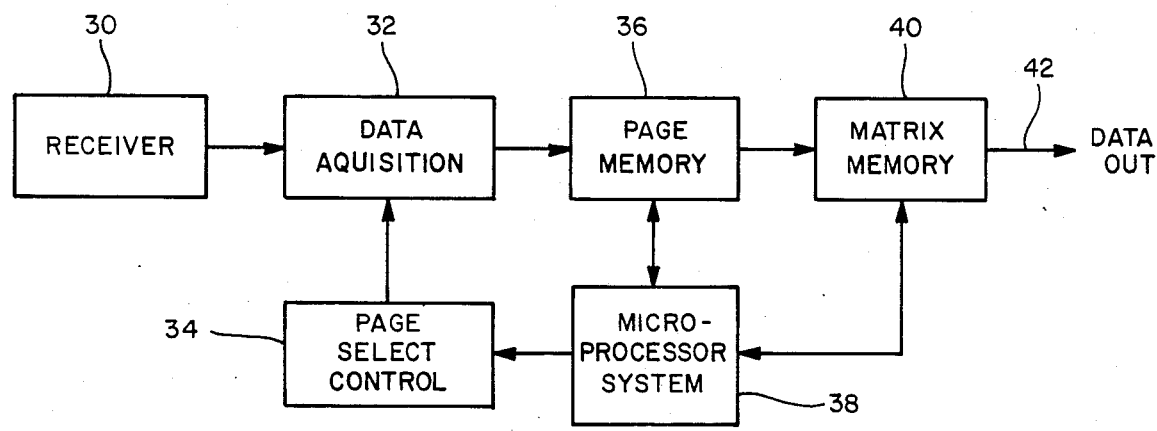

Referring to the drawings, FIGS. 1 and 2 respectively illustrate transmitting and receiving apparatus for implementing the forward data error protection method of the invention. As will be explained in further detail hereinafter, this method allows not only for the detection and correction of errors within data packets but also for the recovery of lost data packets. In addition, different levels of forward data error protection may be conveniently provided on a basis which is tailored to the type of data being delivered as well as to the integrity of the data path being used.

Figures 3, 4, 5:
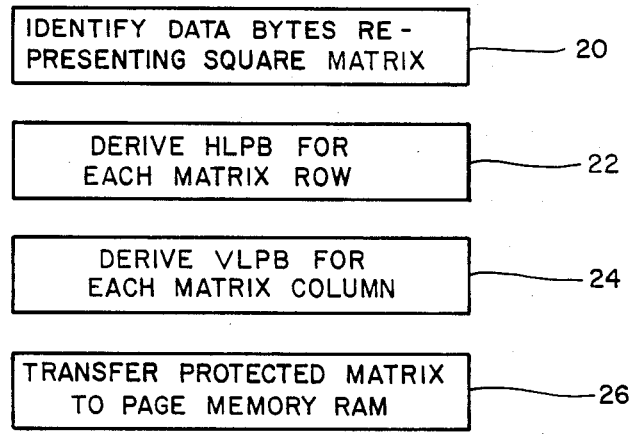
FIG. 3 is a graphical representation of a generalized 4th order error protected data matrix transmitted by the transmitter of FIG. 1.
FIG. 4 is a flow chart illustrating the steps employed in forming the matrix of FIG. 3.
FIG. 5 is a specific example of the matrix of FIG. 3.

With reference to FIG. 3, it will be seen that the forward error protection method of the invention is generally based on a scheme wherein a plurality of data bytes are arranged in a square matrix with longitudinal parity bytes being formed therefrom in both the horizontal and vertical directions. Square matrices were chosen as the basic building block because their general properties allow for the generation of relatively simple software routines to decode matrices of different orders. The order of the matrix (the number of rows or columns) multiplied by the number of matrices required to accommodate a full page defines the average number of data bytes that can be corrected per page. Particular matrix sizes can be singled out for their relative improvements of data integrity. Matrices of orders nineteen, eleven, seven, five and four allow for the correction of from one to five data packets per page respectively. For exemplary purposes, FIG. 3 illustrates a data matrix of order four, i.e., four rows by four columns of bytes, it being understood that a plurality of such matrices would be formed to transmit a complete page of data.

Apparatus for formatting and transmitting protected matrices of the type illustrated in FIG. 3 is shown in block diagram form in FIG. 1. A computer system 10 generates the data bytes which are desired to be transmitted and applies the bytes to a matrix formatter 12. Matrix formatter 12 formats the data bytes into a protected matrix of a selected order, e.g., order 4 as illustrated in FIG. 3, which is temporarily stored in a matrix RAM 13. The contents of matrix RAM 13 are subsequently transferred for storage in a page memory RAM 14 according to an algorithm to be discussed in further detail hereinafter. After the first protected matrix has been appropriately formatted and transferred from matrix RAM 13 to page memory RAM 14, a second matrix is formatted and similarly transferred to page memory RAM 14, and so on until RAM 14 is loaded with a full page of data. Typically, a page of data will comprise 24 packets (each corresponding to a row of page memory RAM 14), each packet comprising 32 bytes.

Each packet stored in page memory RAM 14 is coupled in turn to an inserter circuit 15 which encodes each respective packet onto an individual horizontal line of a television signal. Normally, three lines in the vertical blanking interval of the television signal are used for this purpose. As a consequence, eight fields or four frames of the television signal are used to encode the complete 24-packet page. The encoded television signal developed at the output of inserter circuit 15 is then transmitted through a selected transmission medium by a transmitter 16 and, as will be explained in further detail hereinafter, received, decoded and corrected as necessary by a decoder 18.

The flow chart of FIG. 4 further delineates the system methodology at the transmitting site. In particular, in step 20 matrix formatter 12 receives a group of data bytes from computer system 10 and arranges the data bytes in a square matrix for storage in matrix RAM 13 such as illustrated by the fourth order data byte matrix of FIG. 3. It will be observed that this matrix comprises nine data bytes arranged in three rows by three columns. As explained previously, larger order matrices can also be employed although the level of forward error protection generally decreases with increases in matrix order. Matrix formatter 12 also executes steps 22 and 24 to derive a horizontal longitudinal parity byte (HLPB) for each matrix row and a vertical longitudinal parity byte (VLPB) for each matrix column, the derived HLPB's and the derived VLPB's being stored in the last column and row respectively of matrix memory 13 as illustrated in FIG. 3. This derivation process involves Exclusive-Oring all of the corresponding bits of each data byte in a matrix row or column and complementing the result to obtain each bit of the respective HLPB or VLPB. A specific example of the process is illustrated in FIG. 5. In particular, the first bit of HLPB 0,3 is formed by Exclusive-Oring the first bits of data bytes 0,0; 0,1; and 0,2 (1-0-1) and complementing the result to yield a 1. The second bits of data bytes 0,0; 0,1 and 0,2 are similarly Exclusive-Ord and complemented to yield the second bit (1) of HLPB 0,3, and so on until each of the first seven bits have been so processed. The eight bit of HLPB 0,3, as well as the eight bit of each of the data bytes, is a parity bit formed by Exclusive-Oring the other seven bits in the respective byte and complementing the result.

The remaining HLPB's (i.e., 1,3 and 2,3) are formed in the same manner with HLPB 1,3 being derived by processing data bytes 1,0; 1,1 and 1,2 and HLPB 2,3 by processing data bytes 2,0; 2,1 and 2,2. The VLPB's 3,0; 3,1 and 3,2 are also formed in a similar manner except that, in this case, the bits forming each VLPB are derived by processing the corresponding bits of the data bytes in the same column. Thus, the first bit of VLPB 3,0 is derived by processing the first bits of data bytes 0,0; 1,0 and 2,0 (1-0-1) to yield a 1, the second bit by processing the second bits of the same data bytes (0-1-0) to yield a 0, and so on. As before, the eight bit of each VLPB is a parity bit formed by processing the other seven bits in the respective byte.

Figures 6, 7, 9:
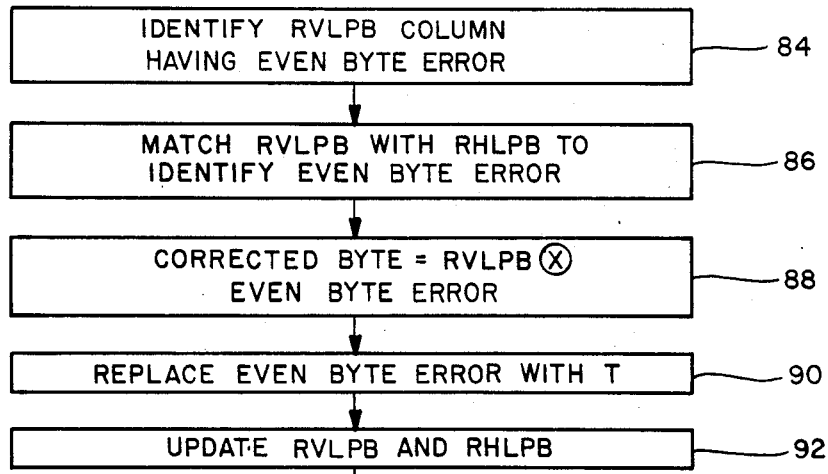
FIGS. 6 and 7 are charts depicting the technique used for storing and transmitting a plurality of protected matrices according to the invention.
FIGS. 8 and 9 are flow charts illustrating the steps employed by the decoder of FIG. 2 in detecting and correcting erroneously received data.

As indicated by step 26, the formatted matrix stored in matrix RAM 13 is subsequently transferred for storage in page memory RAM 14 allowing the following matrices to be similarly formatted and transferred. The algorithm for effecting these transfers is represented by the chart of FIG. 6. In particular, this data transfer algorithm takes into account the observation that the probability of losing two or more data packets in transmission substantially decreases as the spacing between the packets increases. Thus, by arranging the bytes stored in page memory RAM 14 such that the individual rows of a particular matrix are stored for transmission in packets which are separated from each other as much as possible, the probability that more than one row of any matrix will be lost in transmission is substantially reduced. As will be seen hereinafter, this technique greatly facilitates the recovery of packets when they are lost in transmission.

The chart of FIG. 6 illustrates a data transfer and transmission algorithm based on the foregoing priciples and in which the transmission of corresponding portions of two or more rows of any given matrix cannot occur within a single packet. It will be understood that the chart of FIG. 6 corresponds to the manner in which bytes are stored in page memory RAM 14, with the stored packets being transmitted in sequence beginning with packet 0. Further, while the chart of FIG. 6 illustrates the manner in which matrices of order eight are stored in page memory RAM 14, the storage algorithm is the same for matrices of any other order. Referring specifically to FIG. 6, the first eight bytes of packet 0 are reserved for a page address with the next 16 bytes representing a leader matrix comprising various control codes including a code identifying the size of the matrices stored in the RAM (in this example - order eight). The remaining memory in RAM 14 is used to store the protected matrices.

It will be recalled that a page of data comprises 24 rows or packets, each comprising 32 bytes. Therefore, one complete page comprises 768 bytes. Since 24 bytes have been reserved for the address code and leader matrix, 744 bytes per page are available for the transmission of protected data matrices. In the example of FIG. 6 (i.e., 8th order matrices), eleven matrices, referred to as A-K, can therefore be transmitted on a page. The protected data matrices are stored in page memory RAM 14 according to an algorithm wherein the first rows A0-K0 of the matrices are stored for sequential transmission immediately following the leader matrix, followed by the second rows A1-KI, and so on until the entire page has been transmitted. Thus, with reference to FIG. 6, the first row A0 of the first matrix A is transmitted during the final 8 bytes of packet 0, the first rows B0-E0 of matrices B-E are sequentially transmitted during packet 1, and so on until the entire page has been transmitted. As mentioned above, this separation of transmitted matrix rows greatly facilitates the subsequent recovering of any data packets which may have been lost during the transmission process.

It will be appreciated that the same algorithm can be used for the storage and transmission of matrices of different orders. For example, in the case of the 4th order matrices illustrated in FIGS. 3 and 5, 46 matrices per page would be transmitted according to the chart of FIG. 7. It will be observed that the row separation for the 4th order matrices of FIG. 7 is greater than that for the 8th order matrices of FIG. 6 due to the increased number of transmitted matrices.

The transmitted protected matrices are received by decoder 18, which is shown in block diagram form in FIG. 2. Decoder 18 comprises a front-end receiver 30 including the necessary tuning and demodulating circuits for providing a baseband representation of the received bytes to a data acquisition circuit 32. Data acquisition circuit 32 is controlled by a page select control 34 which, in turn, is controlled by a microprocessor system 38. Page select control 34, under the control of microprocessor system 38, couples signals representing a desired page of data to data acquisition circuit 32 which then acquires or extracts the selected page from the multiple page data transmission. As part of the data acquisition process, data acquisition circuit 32 compares the parity bit of each acquired byte against the remaining seven bits of the byte to establish whether proper parity exists. Also, upon page acquisition, acquisition circuit 32 initializes a page memory 36 by setting all of its memory bit locations to 1. If the parity bit check performed by the acquisition circuit indicates no parity errors in a particular acquired byte, the byte is written into page memory 36 with the parity bit of the byte being set to 0. On the other hand, if a parity error is detected, the byte is not written into memory such that each bit of the byte, including the parity bit, is stored in memory as a 1. Also, each bit of any lost bytes, i.e., a byte transmitted but not received by decoder 18, will be stored in page memory 36 as a 1. As a consequence, the parity bit associated with each byte stored in page memory 36 constitutes an error flag representing either an odd bit error or a lost byte.

The received bytes are stored in page memory 36 in the same sequence in which they were transmitted. Thus, a received page will be stored in page memory 36 in a form corresponding to the charts of FIGS. 6 and 7. Microprocessor system 38 extracts the respective rows of each matrix from page memory 36 for temporarily reconstructing each matrix in sequence in a matrix memory 40. Each matrix temporarily stored in matrix memory 40 is subjected to an error detection and correction routine stored in microprocessor system 38 and subsequently output on a line 42.

Figure 8:
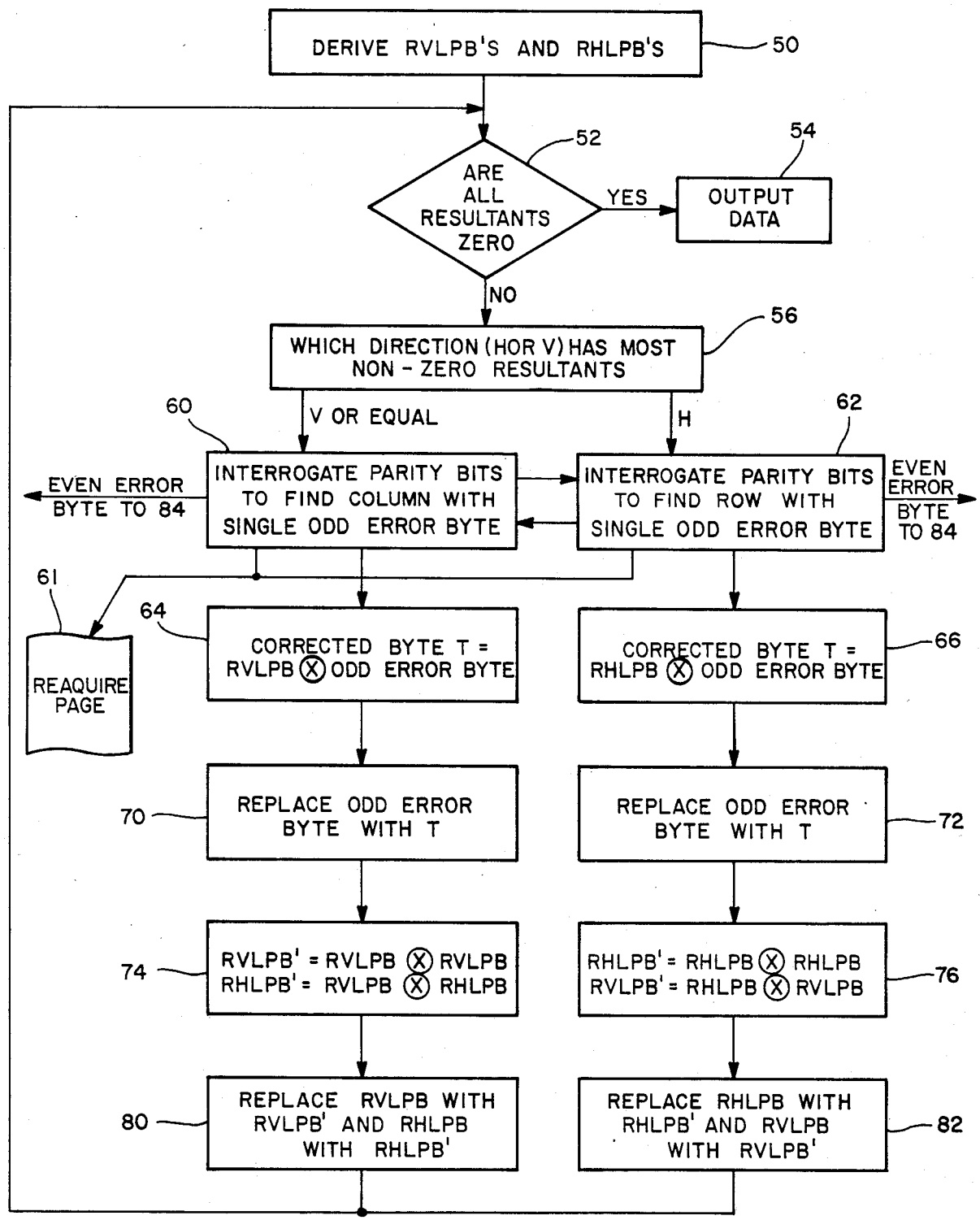

The error detection and correction routine implemented by microprocessor system 38 is illustrated in flow chart form in FIGS. 8 and 9. Referring initially to FIG. 8, the routine first executes a step 50 for deriving a plurality of quantities referred to herein as resultant vertical longitudinal parity bytes (RVLPB's) and resultant horizontal longitudinal parity bytes (RHLPB's). FIG. 10 illustrates the manner in which these resultants are derived in relation to the exemplary matrix of FIG. 5. It is to be understood that all of the bytes illustrated in FIG. 10 are stored in matrix memory 40 and that the sixteen bytes comprising rows 0-3 and columns 0-3 correspond to the received matrix of FIG. 5. In this regard, it is to be observed that the parity bits of these sixteen bytes are all 0 indicating that they have been correctly received (or are characterized by an even bit error).

With further reference to FIG. 10, a RVLPB is derived for each column of the matrix by appropriately processing the data bytes and the VLPB of the respective column. Similarly, a RHLPB is derived for each row of the matrix by processing the data bytes and the HLPB of the respective row. Thus, for example, RVLPB 4,0 is derived for column 0 by processing the three data bytes 0,0; 1,0; and 2,0 together with VLPB 3,0. As before, this processing step involves Exclusive-Oring the corresponding bits of these bytes and complementing the result to obtain each bit of the RVLPB. RHLPB 0,4 is derived by similarly processing the corresponding bits of data bytes 0,0; 0,1; and 0,2 together with HLPB 0,3. It will be observed that for correctly received data as depicted in FIG. 10 all of the RVLPB's and al of the RHLPB's have 0 values.

Returning to FIG. 8, after the resultant bytes have been derived according to step 50, the resultants are interrogated in a step 52 to determine whether they all have 0 values. If all of the resultant bytes have 0 values, it is assumed that all of the data has been correctly received and the data is output on line 42 and coupled to an output device per a step 54. On the other hand, the determination that any resultant byte has a non-zero value comprises an error detection representing that one or more received data bytes is characterized by an error. In the latter case, the routine of FIG. 8 branches to a step 56 which begins a process whereby an attempt is made to identify and correct the error or errors.

In step 56, the error identification procedure is begun by first determining which direction (horizontal or vertical) has the greater number of non-zero value resultants. Thus, if there are more non-zero value RVLPB's than RHLPB's, or if the number of non-zero value RVLPB's is equal to the number of non-zero value RHLPB's, the routine branches to a step 60. If the number of non-zero value RHLPB's exceeds the number of non-zero value RVLPB's the routine branches to a step 62. In steps 60 and 62 the parity of the stored data bytes is interrogated to determine a column (step 60) or row (step 62) which contains a single byte in error. If such a single byte error is detected in either step 60 or 62, the error is corrected as described below. On the other hand, if only multiple byte errors are detected in either the columns (step 60) or rows (step 62), the routine branches to the opposite step to search for and correct any single byte errors in the other direction. If only multiple byte errors are again detected in this latter step, the errors cannot be corrected and an instruction 61 is executed to reacquire the page. Alternatively, the erroneous data can be output in accordance with step 54. It will be recalled that the parity bit of every data byte having an odd bit error had previously been set to 1 to facilitate the foregoing interrogation steps. Therefore, if it is determined during the execution of step 60 or 62 that no data bytes have a 1 parity bit, it is assumed that any errors are even bit errors and the routine of FIG. 6 branches to an even bit error correction subroutine illustrated in flow chart form in FIG. 9.

Assuming that a single byte error was of an odd bit nature, the routine of FIG. 8 proceeds to either step 64 or 66. In these steps, a corrected byte T is formed by Exclusive-Oring the odd bit error data byte identified in step 60 or 62 with the resultant in the corresponding column (step 64) or row (step 66). Next, the odd bit error data byte is replaced in matrix memory 40 with the corrected byte T in step 70 or 72 and the routine continues to step 74 or 76. In steps 74 and 76 the resultant used to derive the corrected byte T in step 64 or 66 is updated by Exclusive-Oring it with itself and the other resultant in the same row or column in which the corrected byte T was stored is updated by similarly Exclusive-Oring it with the resultant used in step 64 or 66. Finally, the two updated resultants are stored in matrix memory 40 in place of the original corresponding resultants in step 80 or 82 and the routine returns to re-execute step 52 for the next matrix transferred to matrix memory 40 from page memory 36. If any non-zero value resultants are again detected in step 52, the entire error detection and correction routine is repeated; otherwise, the data is output according to step 54.

Referring to FIG. 9, even bit data byte errors detected in steps 60 or 62 of FIG. 8 initiate a subroutine beginning with a step 84 in which the non-zero value RVLPB in the column containing the even bit error data bit is identified. In step 86 the RHLPB matching the RVLPB identified in step 84 is identified for identifying the location of the even bit error data byte at their intersection point in the matrix. A corrected byte T is then formed in a step 88 by Exclusive-Oring the even bit error data byte identified in step 86 with the RVLPB identified in step 84 and the even bit error data byte is replaced in matrix memory 40 with the corrected byte T in step 90. Finally, both the identified RVLPB and the ientified RHLPB are updated in step 92 and the subroutine is returned to step 52 of FIG. 8.

In order to faciitate a more thorough understanding of the foregoing, several examples of the error detection and correction method of the invention are presented below. These examples include the correction of a received matrix characterized by two bytes having single bit errors (Example 1), a received matrix representing a lost data packet (Example 2) and a received matrix characterized by a data byte having a double bit error (Example 3). The errors in these examples are in relation to the correctly received matrix illustrated in FIGS. 5 and 10.

EXAMPLE 1

In this example, see FIG. 11, the received matrix originally stored in matrix memory 40 is characterized by single bit errors in data bytes 0,0 and 0,1. In particular, the third bit of data byte 0,0 has been stored as a 0 instead of a 1 and the seventh bit of data byte 0,1 has been stored as a 1 instead of a 0. As a consequence the parity bit of each data byte is stored in memory 40 as a 1 and RVLPB's 4,0 and 4,1 as well as RHLPB 0,4 have non-zero values. Therefore, RVLPB 4,0 is initially Exclusively-Ored with data byte 0,0 to form corrected byte T0,0 = 10101010 which replaces data byte 0,0 in memory 40. Next, RVLPB 4,0 and RHLPB 0,4 are updated and stored in memory 40 in place of the original values. In this case, updated RVLPB 4,0 (i.e. RVLPB')=0000000X and updated RHLPB 0,4 (i.e RHLPB')=0000001X.

The routine is now again repeated beginning with step 52. Since RVLPB 4,1 and RHLPB 0,4 are still characterized by non-zero values, RVLPB 4,1 is Exclusively-Ored with data byte 0,1 to form corrected byte T0,1 = 01001100, corrected byte T0,1 replacing byte 0,1 in memory 40. Updating of the resultants results in RVLPB 4,1=0000000X and RHLPB 0,4=0000000X. Since all of the resultants now have 0 values, the next time the routine is executed beginning with step 52, the corrected data will be output in accordance with step 54.

EXAMPLE 2

FIG. 12 illustrates the situation where an entire data packet has been lost in transmission as represented by the bits of all the data bytes of row 0 being 1. Restoration of the lost data bytes is accomplished by executing the routine of FIG. 8 for each of columns 0–2of the matrix (while updating the respective RVLPB for each column as well as RHLPB 0,4). Also, the routine will be executed one additional time for column 3 to restore lost HLPB 0,3. The results of the foregoing are summarized in Table 1 below:

TABLE 1

| | T | Updated RVLPB | Updated RHLPB 0,4 |
|---|---|---|---|
| Column 0 | 10101010 | 0000000X | 1010101X |
| Column 1 | 01001100 | 0000000X | 0001100X |
| Column 2 | 11001010 | 0000000X | 0010110X |
| Column 3 | 11010010 | 0000000X | 0000000X |

It will be appreciated that proper restoration of the data bytes comprising row 0 of the matrix is facilitated by the fact that no other rows of the matrix were transmitted during the lost packet in accordance with the transmission algorithm previously described.

EXAMPLE 3

FIG. 13 illustrates the condition of a double bit error in data byte 0,0. In particular, the first and seventh bits of the data byte are 0 instead of 1. As a consequence, both RVLPB 4,0 and RHLPB 0,4 have non-zero values. Further, since none of the parity bits of the stored bytes are 1, the subroutine of FIG. 9 is accessed from step 60 of FIG. 8. In executing the subroutine, it is determined that data byte 0,0 is in error since it is at the intersection point of matching RVLPB 4,0 and RHLPB 0,4 (both being equal to 1000001X). Consequently, corrected byte T0,0 = 10101010 is formed per step 88 and stored in memory 40 in place of the double bit error data byte. RVLPB 4,0 and RHLPB 0,4 are then each updated to 0000000X and the main routine of FIG. 8 is returned to at step 52. Since all of the resultants have 0 values, the corrected data is output to the output device per step 54.

What has thus been shown is a novel forward error data protection method utilizing horizontally and vertically protected matrices which are transmitted according to an algorighm effecting maximum separation between the rows of the respective matrices allowing for detection and correction of odd and even bit errors as well as for restoration of lost data packets. The extent of data protection afforded by the method is a function of the size of the matrix, less protection generally being provided as the size of the matrix increases, and can thus be conveniently tailored to a particular application.

While particular embodiments of the invention have been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

What is claimed is:

1. A data error detection and correction method comprising:
   providing a plurality of data bytes representing a page of data;
   arranging said plurality of data bytes into a plurality of error protected square matrices;
   sequentially transmitting a plurality of data packets each comprising one or more rows of said square matrices wherein no data packet includes corresponding portions of two or more rows of any one of said matrices;
   receiving said data packets and sequentially reconstructing said plurality of square matrices in response thereto;
   processing each of said sequentially reconstructed square matrices for detecting and correcting any errors therein.

2. The method of claim 1 wherein said transmitting step comprises successively transmitting corresponding rows of said plurality of square matrices in a predetermined sequence.

3. The method of claim 1 wherein a selected one of said plurality of data packets includes a predetermined code defining the order of said square matrices.

4. The method of claim 3 wherein said arranging step comprises arranging said plurality of data bytes into a plurality of horizontally and vertically error protected matrices of an order defined by said predetermined code.

5. The method of claim 4 wherein said arranging step comprises deriving and including with the data bytes of each row of each of said matrices a horizontal longitudinal parity byte (HLPB) and with each column of each of said matrices a vertical longitudinal parity byte (VLPB), each of said longitudinal parity bytes being derived by processing the corresponding bits of the data bytes in a respective row or column of each of said matrices.

6. The method of claim 5 wherein said detecting and correcting step for each sequentially reconstructed matrix comprises:
   deriving a resultant horizontal longitudinal parity byte (RHLPB) for each row of the reconstructed matrix and a resultant vertical longitudinal parity byte (RVLPB) for each column of the reconstructed matrix, each of said resultant longitudinal parity bytes being derived by processing the corresponding bits of the bytes in a respective row or column of the reconstructed matrix;
   making either a first decision that all of the data bytes have been correctly received if all of the resultant longitudinal parity bytes have zero values or a second decision that at least one data byte has been incorrectly received if one or more of the resultant longitudinal parity bytes has a non-zero value; and
   responsive to the second decision, correcting an incorrectly received data byte by processing it with a non-zero value resultant longitudinal parity byte in the same row or column of the reconstructed matrix.

7. The method of claim 6 wherein each of said transmitted bytes includes a parity bit and including, responsive to said second decision, the step of interrogating said parity bits to determine whether an incorrectly received data byte is characterized by an odd or an even bit error.

8. The method of claim 7 including, responsive to a determination that an incorrectly received data byte is characterized by an odd bit error, identifying on the basis of said parity bits a row or column of the reconstructed matrix having said odd bit error data byte for facilitating said correcting step.

9. The method of claim 8 including, responsive to a determination that an incorrectly received data byte is characterized by an even bit error, identifying the even bit error data byte as the data byte having equal) non-zero value vertical and horizontal longitudinal parity bytes for facilitating said correcting step.

10. The method of claim 8 wherein said identifying step comprises determining whether the RVLPB's or the RHLPB's derived from the reconstructed matrix have the most non-zero values and establishing on the basis of said parity bits the column, in the case where the RVLPB's have the most non-zero values, or the row, in the case where the RHLPB's have the most non-zero values, of the reconstructed matrix having said odd bit error data byte for facilitating said correcting step.

11. The method of claim 10 including the step of updating the RVLPB's and the RHLPB's derived from the reconstructed matrix after said data byte correcting step.

12. A data error detection and correction method comprising:
   providing a plurality of data bytes representing a page of data;
   arranging said plurality of data bytes into a plurality of square matrices each row of which includes a horizontal longitudinal parity byte and each column of which includes a vertical longitudinal parity byte, each of said longitudinal parity bytes being derived by processing the corresponding bits of the data bytes in the respective row or column of each of said matrices;
   sequentially transmitting a plurality of data packets each comprising one or more rows of said square matrices with the rows being arranged in the packets for successive transmission of corresponding rows in a predetermined sequence;
   receiving said data packets and sequentially reconstructing said plurality of square matrices in response thereto;
   deriving a resultant horizontal longitudinal parity byte (RHLPB) for each row of the reconstructed matrix and a resultant vertical longitudinal parity byte (RVLPB) for each column of the reconstructed matrix, each of said resultant longitudinal parity bytes being derived by processing the corresponding bits of the bytes in a respective row or column of the reconstructed matrix;
   making either a first decision that all of the data bytes have been correctly received if all of the resultant longitudinal parity bytes have zero values or a second decision that at least one data byte has been incorrectly received if one or more of the resultant longitudinal parity bytes has a non-zero value; and responsive to the second decision, correcting an incorrectly received data byte by processing it with a non-zero value resultant longitudinal parity byte in the same row or column of the reconstructed matrix.

13. A data error detection and correction method comprising:

providing a plurality of data bytes representing a page of data;

arranging said plurality of data bytes into a plurality of square matrices each row of which includes a horizontal longitudinal parity byte and each column of which includes a vertical longitudinal parity byte, each of said longitudinal parity bytes being derived by processing the corresponding bits of the data bytes in the respective row or column of each of said matrices;

sequentially transmitting a plurality of data packets each comprising one or more rows of said square matrices wherein no data packet includes corresponding portions of two or more rows of any one of said matrices;

receiving said data packets and sequentially reconstructing said plurality of square matrices in response thereto;

deriving a resultant horizontal longitudinal parity byte (RHLPB) for each row of the reconstructed matrix and a resultant vertical longitudinal parity byte (RVLPB) for each column of the reconstructed matrix, each of said resultant longitudinal parity bytes being derived by processing the corresponding bits of the bytes in a respective row or column of the reconstructed matrix;

making either a first decision that all of the data bytes have been correctly received if all of the resultant longitudinal parity bytes have zero values or a second decision that at least one data byte has been incorrectly received if one or more of the resultant longitudinal parity bytes has a non-zero value; and responsive to the second decision, correcting an incorrectly received data byte by processing it with a non-zero value resultant longitudinal parity byte in the same row or column of the reconstructed matrix.

14. The method of claim 13 wherein each of said transmitted bytes includes a parity bit and including, responsive to said second decision, the step of interrogating said parity bits to determine whether an incorrectly received data byte is characterized by an odd or an even bit error.

15. The method of claim 14 including, responsive to a determination that an incorrectly received data byte is characterized by an odd bit error, identifying on the basis of said parity bits a row or column of the reconstructed matrix having said odd bit error data byte for facilitating said correcting step.

16. The method of claim 15 including, responsive to a determination that an incorrectly received data byte is characterized by an even bit error, identifying the even bit error data byte as the data byte having equal non-zero value vertical and horizontal longitudinal parity bytes for facilitating said correcting step.

17. The method of claim 15 wherein said identifying step comprises determining whether the RVLPB's or the RHLPB's derived from the reconstructed matrix have the most non-zero values and establishing on the basis of said parity bits the column, in the case where the RVLPB's have the most non-zero values, or the row, in the case where the RHLPB's have the most non-zero values, of the reconstructed matrix having said odd bit error data byte for facilitating said correcting step.

18. The method of claim 17 including the step of updating the RVLPB's and the RHLPB's derived from the reconstructed matrix after said data byte correcting step.

* * * * *